United States Patent Office 3,488,330
Patented Jan. 6, 1970

3,488,330
ACRYLONITRILE COPOLYMERS CONTAINING SULFONIC ACID GROUPS
Jeno Szita, Dormagen, Ulrich Bahr, Opladen-Luetzenkirchen, and Herbert Marzolph and Gunther Nischk, Dormagen, Germany, assignors to Farbenfabriken Bayer Aktiengesellschaft, Leverkusen, Germany, a corporation of Germany
No Drawing. Filed July 19, 1967, Ser. No. 654,387
Claims priority, application Germany, July 28, 1966, F 49,814
Int. Cl. C08f 15/22
U.S. Cl. 260—79.3                                   10 Claims

ABSTRACT OF THE DISCLOSURE

This invention relates to acrylonitrile copolymers containing sulfonic acid groups and to a process for their production. The process is carried out by copolymerising in the presence of a radical forming catalyst in a liquid medium at least 50% by weight of acrylonitrile with 0.1–10% by weight of an ethylenically unsaturated sulfonic acid compound of the formula

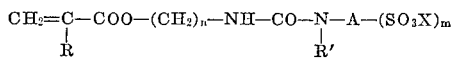

wherein R and R′ each represents a hydrogen atom or an alkyl radical, $n$ represents 2, 3 or 4, A represents an aliphatic hydrocarbon radical with at least two carbon atoms or an aromatic hydrocarbon radical, X represents hydrogen, ammonium, an alkali metal or organic ammonium cation, and $m$ represents 1 or 2, the balance being one or more additional copolymerisable monomers. The acrylonitrile copolymers show a high affinity for basic dyes.

---

This invention relates to acrylonitrile copolymers containing sulfonic acid groups and to a process for their production by copolymerising acrylonitrile with unsaturated compounds containing sulfonic acid groups, said acrylonitrile copolymers showing a high affinity for basic dyes.

The affinity for dyes of filaments and yarns made from acrylonitrile homopolymers and copolymers with neutral comonomers is not sufficient to meet practical requirements. Accordingly, it is difficult to dye them in fairly deep shades with basic or acidic dyes. The reason for this lies in the complete or partial absence of dye-receptive groups from the polymer. In order to overcome these difficulties, several proposals have already been put forward for modifying acrylonitrile polymers.

It has already been proposed to copolymerise acrylonitrile with basic comonomers, for example, vinyl pyridine and derivatives thereof. Thus, although it was possible in this way to increase the affinity of the resulting textile products for acidic dyes, this improvement could only be obtained at the expense of other properties such as natural colour, thermal stability and affinity for basic dyes.

To improve dyeability with basic dyes, copolymers were prepared with comonomers containing carboxyl groups, such as acrylic acid, methacrylic acid or itaconic acid. Unfortunately, such polymers show a very marked tendency towards disclouration at elevated temperatures.

Although it is possible to improve receptivity to basic dyes by including comonomers containing sulfo groups in the polymer, the conventional methods of doing this are in many respects unsatisfactory from the technical point of view. Sodium methallyl and allyl sulfonates can only be copolymerised with acrylonitrile in poor yields and only a fraction of the comonomer used is incorporated in the polymer. This defect also applies to copolymers of acrylonitrile with N-monosubstituted acrylamide derivatives containing sulfo groups, such as N-acryloyltaurine or N-acrylol-p-aminophenyl-methane sulfonic acid. Although other known comonomers containing sulfo groups, for example, vinyl sulfonic acid and vinyl benzene sulfonic acid and their salts, can be copolymerised in aqueous medium, they are difficult to use in solution polymerisation owing to their limited solubility in the organic solvents conventionally employed. In solution polymerisation, where polymerisation is carried out in a solvent in which the polymer formed is soluble the starting materials and in particular the comonomers used have to be readily soluble in the reaction medium. If this is not the case, the comonomers cannot be statistically incorporated into the macromolecule, as they should be, while at the same time the tendency of the resulting solutions towards gel-formation is increased, due both to the presence of undissolved particles and to salt depositions, with the result that the solutions become extremely difficult to spin.

It is an object of this invention to provide acrylonitrile copolymers containing sulfonic acid groups in the form of recurring units of the formula

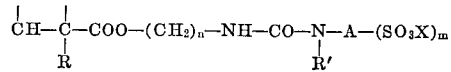

where R and R′ each represents a hydrogen atom or an alkyl radical, $n$ represents 2, 3 or 4, A represents an aliphatic hydrocarbon radical with at least two carbon atoms or an aromatic hydrocarbon radical, X represents hydrogen, ammonium, an alkali metal or organic ammonium cation, and $m$ represents 1 or 2.

The acrylonitrile copolymer comprises at least 50% by weight of acrylonitrile and 0.1 to 10% by weight of an ethylenically unsaturated monomer of the formula

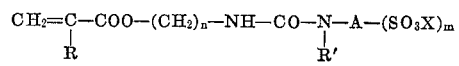

wherein R, R′, A, X, $n$ and $m$ have the meanings as described above, the balance being one or more additional copolymerisable monomers.

It has been found that acrylonitrile copolymers which have an acrylonitrile content of at least 50% and show an improved affinity for basic dyes and high thermal stability, coupled with a limited tendency toward gel-formation in concentrated solution, can be obtained by a process in which acrylonitrile is copolymerised in the presence of a radical-forming catalyst and optionally in the presence of one or more additional comonomers, with 0.1 to 10% by weight of an ethylenically unsaturated sulfonic acid compound of the formula

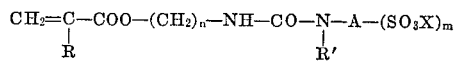

wherein R and R′ each represents a hydrogen atom or an alkyl radical, $n$ represents 2, 3 or 4, A represents an aliphatic hydrocarbon radical with at least 2 carbon atoms or an aromatic hydrocarbon radical, such as a phenylene-, substituted phenylene-, or naphthylene radical, X represents hydrogen, NH₄, an alkali metal or organic ammonium cation, and $m$ represents 1 or 2.

The compounds of the above general formula can be obtained in high yields by reacting an unsaturated isocyanate having the formula

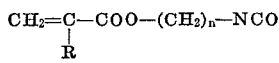

with an aminosulfonic acid salt of the formula

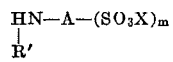

wherein R, R', A, $n$ and $m$ have the meanings given above, while X preferably represents an alkali-metal cation. It is an important technological advantage that the reaction can also be carried out in aqueous solution, in which case the reaction is almost complete while no cleavage products are formed. Thus, the highly concentrated (up to 65% by weight) aqueous solutions formed may be directly used for polymerisation.

The following are examples of compounds suitable for use as ethylenically unsaturated sulfonic acids in the process according to the invention:

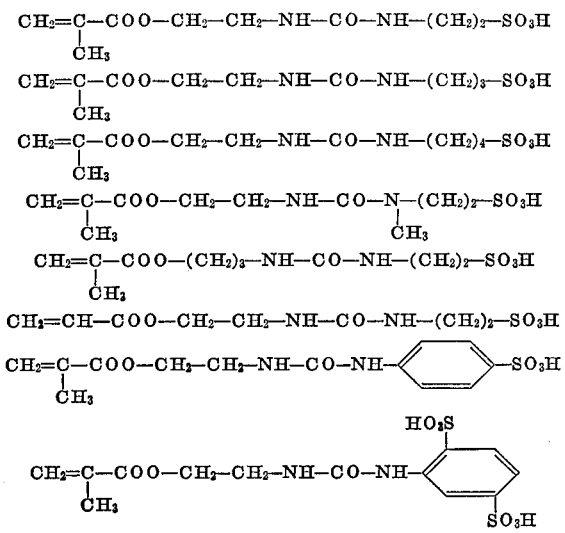

The alkali-metal salts of these compounds formed during preparation are preferably used for copolymerisation. Surprisingly they are readily soluble not only in an aqueous polymerisation medium, but also in organic solvents such as dimethyl formamide, dimethyl acetamide, dimethyl sulphoxide and ethylene carbonate, so that they may also be used in the solution polymerisation or copolymerisation of acrylonitrile in the aforementioned organic solvents.

The quantity in which it is desired to incorporate the sulfonic acids into the acrylonitrile polymer, is governed largely by the purpose for which the polymers are to be used and also inter alia by the type of polymerisation and by the type of catalysts used. Catalyst systems (for example persulphate/bisulphite) which give terminal groups reactive with cationic dyes, will generally be used in cases where polymerisation is carried out in aqueous medium. If it is intended to use the copolymers for the production of filaments and fibres, it is usually sufficient in this instance to use only 0.5 to 1.0% of the ethylenically unsaturated sulfonic acid compound for polymerisation in aqueous medium in order to obtain the level of dyeability normally required for practical purposes. In order to obtain special effects, for example a marked improvement either in the hydrophilic properties or in the swelling capacity of the polymers the ethylenically unsaturated sulfonic acid compound may be included in the polymer in a quantity from 4 to 8%.

In the solution polymerisation of acrylonitrile in an organic solvent, for example dimethyl formamide, dimethyl acetamide, dimethyl sulfoxide or ethylene glycol carbonate, it is usually necessary to use more of the ethylenically unsaturated sulfonic acid compound than is required for aqueous polymerisation in order to obtain the same level of dyeability. In this case, all the sulfo groups have to be incorporated by copolymerisation because the preferred catalysts give neutral terminal groups. The most convenient quantity of ethylenically unsaturated sulfonic acid compound is usually from 2 to 4% by weight based on the total amount of monomer. One particular advantage of the process is that the ethylenically unsaturated sulfonic acid compounds are readily soluble in the aforementioned solvents, even in this relatively high concentration, and as a result make it possible to prepare satisfactory spinning solutions, even by solution polymerisation in organic solvents.

Acrylonitrile is preferably copolymerised with the ethylenically unsaturated sulfonic acid compound in the presence of one or more additional copolymerisable unsaturated compounds. Compounds of this kind include inter alia acrylates and methacrylates, vinyl esters, styrene and neutral derivatives thereof, vinyl chloride, vinylidene chloride, vinyl bromide, butadiene, chloroprene, acrylamide, methacrylamide, vinyl alkyl ketones, vinylidene cyanide or divinyl compounds, as well as basic comonomers, for example, vinyl pyridine and derivatives thereof.

By including in the polymer a third comonomer for example methyl acrylate, methyl methacrylate or vinyl acetate the solubility of the polymers can be substantially improved and the dyeability of the resulting fibres further increased. The quantity in which these comonomers are present in the polymer may be from 2 to 10% by weight and is preferably from 5 to 7% by weight.

If it is desired to obtain readily dyeable polyacrylic fibres with specific properties, the additional comonomers will generally be used in a fairly large proportion relative to the acrylonitrile. If acrylonitrile is copolymerised with 1 to 3% by weight of the ethylenically unsaturated sulfonic acid compound and, for example, with 25 to 45% by weight of vinylidene chloride, it is possible to obtain highly soluble polymers and highly concentrated spinning solutions while at the same time the fibres spun from these solutions show greatly reduced inflammability in addition to their high affinity for dyes and thermal stability.

Acrylonitrile may be copolymerised with the comonomers by conventional methods of polymerisation, for example in aqueous emulsion, dispersion or in solution. In the case of emulsion polymerisation, conventional emulsifiers such as salts of fatty acids, alkyl or aryl sulfonates, and non-ionic emulsifiers may be used. In cases where comonomers sparingly soluble in water, for example vinylidene chloride, are used, solution promoters, for example lower alcohols, may be used in dispersion polymerisation. Solution polymerisation may be carried out in aqueous concentrated salt solutions, for example, zinc or calcium chloride solutions or solutions of inorganic thiocyanates, and in organic solvents such as dimethyl formamide, dimethylacetamide, dimethyl sulphoxide, ethylene glycol carbonate or butyrolactone.

Polymerisation in aqueous medium is preferably carried out in the absence of emulsifiers using water-soluble radical-forming catalysts or catalyst systems, such as inorganic or organic peroxidic compounds, as well as azo compounds. In general, however, it is preferred to use redox systems, particularly those based on peroxidic compounds and compounds of sulfur in a low oxidation stage. The water-soluble salts of peroxydisulfuric acid, for example potassium or sodium or ammonium persulfate, are preferably used as the peroxidic compounds in the redox system. Sulfur dioxide, alkali metal hydrosulfites, alkali metal pyrosulfites and alkali metal thiosulfates are extremely effective reduction components. Of these, sodium or potassium hydrogen sulfite or pyrosulfite are preferably used. The catalysts are conveniently used in quantities of 0.5 to 5% by weight, based on the total weight of the monomers. The ratio between oxidising and reducing agents in the redox system can be from 2:1 to 1:50 and is preferably from 1:2 to 1:10. In order further to activate the catalyst system, relatively small quantities of salts containing heavy-metal ions, such as copper and iron, may be added. Suitable neutral salts, such as alkali metal or alkaline earth metal sulfates or phosphates, may also be present in the polymerisation mixture. Other additives such as regulators, for example mercaptans, or complex formers, for example metaphosphoric acid, oxalic acid, ethylene diamine tetracetic acid or their salts, may also be used. Polymerisation is carried out by conventional continuous cycle or batch processes. The desalted water used is employed in a quantity 5 to 10 times larger than that in which the monomers are used. The reaction temperature may be from 10 to 70° C. and is preferably from 40 to 55° C. The pH-value of the reaction mixture is conveniently from 2 to 6 and is preferably from 2.5 to 4. Concentrated inorganic or organic acids, preferably sulfuric acid, are used to adjust the pH-value. It is often of advantage to carry out polymerisation in an inert gas atmosphere (for example nitrogen). After the reaction has been stopped, optionally by the addition of inhibitors or complex formers or by neutralising the reaction mixture, the fine granular copolymers formed are separated from the liquid phase by filtration or centrifuging, are washed with desalted water and are dried at reduced pressure or in a stream of heated air.

In cases where solution polymerisation is carried out in organic solvents, the quantitative ratio between monomer and solvent in the reaction mixture is variable within wide limits depending on the solvent and on the further comonomers used, and their ratio to the acrylonitrile. If acrylonitrile is copolymerised in dimethyl formamide with only the ethylenically unsaturated sulphonic acid compound, the monomer concentration has to be kept below 25% by weight if clear non-gelling solutions are to be obtained. In cases where copolymerisation is carried out in the additional presence of, for example, 5 to 8% by weight of methyl acrylate or vinyl acetate, the initial monomer concentration may be as much as 40% by weight, although it is preferably from 25% to 35% by weight, without any danger of the solution gelling or clouding during or after completion of polymerisation. In the terpolymerisation of acrylonitrile with approximately 25 to 45% of vinylidene chloride, the concentration of the monomers in dimethyl formamide may with advantage be from 30 to 60% by weight. Due to the poorer solubility of the monomers in dimethyl acetamide, ethylene carbonate and dimethyl sulphoxide, the limits to their initial concentration in these solvents are approximately 5% to 10% by weight lower than in dimethyl formamide.

Radical-forming catalyst systems soluble in the solvents used may be employed to initiate polymerisation. Examples of such catalysts include azo compounds such as azoisobutyronitrile, inorganic peroxides such as ammonium persulfate, organic hydroperoxides, ketone peroxides, acyl peroxides or peresters. Redox systems which are also effective at relatively low temperatures, are preferably used. Systems of this kind may comprise the aforementioned organic peroxides in conjunction with reducing compounds, for example, sulfinic acid derivatives. Effective reducing components based on sulfinic acid include alkali metal or amine salts of sulfinic acids, sulfinic acid esters and amides as well as α-aminosulfones or formamidine sulfinic acid. With redox systems of this kind, the presence of a concentrated acid, for example sulfuric acid or an aromatic sulfonic acid, is advantageous and, in some instances necessary. Some of the aforementioned sulfinic acid derivatives, such as their salts and amides, are effective polymerisation catalysts in the presence of concentrated acids, even without peroxides.

The reaction mixture usually contains up to 3% of the aforementioned catalysts. In the case of redox systems, the molar ratio between peroxide and sulfinic acid derivatives is from 1:0.2 to 1:4. The acid may be used in as high as a fourfold molar excess relative to the sulfinic acid derivative.

The presence of small quantities of water in the solution is usually of advantage. When dimethyl sulfoxide or ethylene carbonate is used as the solvent, the water content can be from 10 to 15% by weight.

The polymerisation temperature is variable within a wide range from 0 to 100° C. depending on the type of catalyst and solvent used, although polymerisation is preferably carried out at a temperature from 25 to 60° C. After the desired rate of conversion or solution concentration has been reached, polymerisation is stopped by the addition of a conventional inhibitor. Thereafter, the solution may be dry-spun or wet-spun by known methods either directly or following removal of any unreacted monomers, for example in a falling-film evaporator at reduced pressure. The spinning solutions thus obtained are either colourless or show only a slight yellowish tinge, and are clear and gel-free so that they can be further processed without any difficulties at all. Following removal of any unreacted monomers, they can be stored for prolonged periods without any appreciable change in their viscosity.

The polymers obtained by aqueous precipitation polymerisation can also be processed by suitable solution processes to form clear, gel-free spinning solutions which can be spun without any difficulty.

The spun filaments show a high degree of whiteness, outstanding thermal stability and excellent textile properties. Their high affinity for basic dyes is attributable to the complete incorporation of the ethylenically unsaturated sulfonic acid compound.

The following examples are to illustrate further this invention without limiting it. The percentage given in the specification and in the following examples are percentages by weight, based on the total quantity, unless otherwise stated.

EXAMPLES 1 TO 6

A double-walled, enamelled 100-litre capacity vessel equipped with a stirring mechanism, reflux condenser, nitrogen inlet and thermostat was used as the reaction vessel for polymerisation. The air was first of all displaced from the vessel with nitrogen, after which 45 litres of desalted water were poured into it, and the pH-value was adjusted to 3.5 with $1/n$ sulfuric acid, followed by heating 55° C. The monomers, totalling 3.5 kg., were then added followed by the catalysts, potassium persulfate and sodium pyrosulfite, each of which was dissolved in 500 ml. of water, as was the ethylenically unsaturated sulfonic acid compound. The temperature of the reaction medium was kept at 50° C., during polymerisation. The reaction was stopped after a polymerisation time of 4 hours, and the fine-grained polymer was isolated in a filter centrifuge, washed free of acid with desalted water and dried in vacuo at 60° C.

Copolymerisation tests were conducted in this way with acrylonitrile and some of the ethylenically unsaturated sulfonic acid compounds and, in some instances, with methyl acrylate as the third comonomer. The monomers used and their proportion in the monomer mixture, the quantities of catalyst, the yield obtained and the K-values of the polymers formed (according to Fikentscher, Cellulose-chemie 13, page 58, 1932), are all set out in Table I below.

Astrazonblau B (Color Index, 2nd Edit., vol. III, No. 42140).

TABLE I

| Example No. | Composition of monomers in the reaction mixture | | Catalysts | | Conversion (percent) | K-value |
|---|---|---|---|---|---|---|
| | Type | Ratio (weight) | $K_2S_2O_8$, g. | $Na_2S_2O_5$, g. | | |
| 1 | AN:AME:I | 94.4:5:0.6 | 22.5 | 90.0 | 83 | 86.1 |
| 2 | AN:I | 95:5 | 25.5 | 102.0 | 85 | 88.7 |
| 3 | AN:AME:II | 94.4:5:0.6 | 23.0 | 92.0 | 85 | 83.2 |
| 4 | AN:II | 95:5 | 28.5 | 114.0 | 88 | 87.6 |
| 5 | AN:AME:III | 94.3:5:0.7 | 22.5 | 90.0 | 86 | 84.7 |
| 6 | AN:III | 95:5 | 28.5 | 114.0 | 89 | 84.5 |
| Comparison | AN:AME | 95:5 | 22.5 | 90.0 | 84 | 85.2 |

AN=acrylonitrile; AME=methyl acrylate;

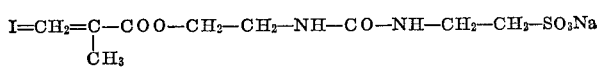

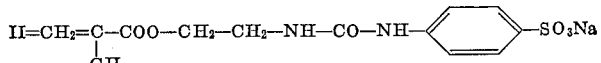

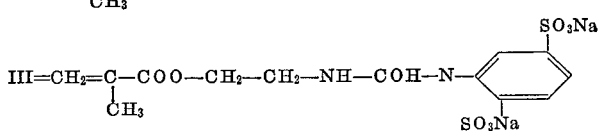

In order to test the tendency to discoloration of the copolymers obtained, they were heated in 5% by weight solution in dimethyl formamide at 80° C. in the presence of air. The extinction coefficients of the solutions were measured after 2, 4, and 20 hours by means of an electrophotometer (Elko III, manufactured by ZEISS), at a wave length of 470 m$\mu$ (cell length=5 cm., comparison solution pure dimethyl formamide). An acrylonitrile-acrylic acid methylester copolymer with a K-value of 85.2, prepared as described in Example 1, was used for comparison. The measurements taken are set out in the following Table II.

TABLE II

| Polymer from Example No. | Extinction values at 470 m$\mu$ after— | | |
|---|---|---|---|
| | 2 hours | 4 hours | 20 hours |
| 1 | 0.258 | 0.317 | 0.618 |
| 2 | 0.260 | 0.302 | 0.594 |
| 3 | 0.268 | 0.283 | 0.552 |
| 4 | 0.290 | 0.310 | 0.610 |
| 5 | 0.225 | 0.280 | 0.580 |
| 6 | 0.235 | 0.275 | 0.530 |
| Comparison | 0.390 | 0.570 | 1.120 |

The sulfo groups incorporated in the polymer were detected as follows by potentiometric titration in dimethyl formamide solution:

1 g. of polymer was dissolved in 100 ml. of distilled dimethyl formamide treated with a mixed-bed ion exchanger. Approximately 5 cm.³ of the mixed-bed ion exchanger were introduced into the solution which was then stirred for from 30 minutes to 1 hour. The solution was then similarly treated with a strongly acid ion exchanger. After this, it was filtered off, 50 ml. being titrated with an N/100 methanolic-KOH-solution. A Knick pH-meter (Type 52, calomel glass electrode) was used as the measuring instrument. The measurements are given in milliequivalents of acid groups per 100 g. of polymer (mval. acid gr./100 g. PM) in Table II.

The improved affinity of the aforementioned copolymers for basic dyes can be demonstrated very easily by dyeing films. For this purpose, films were cast from approximately 15% by weight dimethyl formamide solutions in a layer thickness of approximately 50$\mu$. After drying in vacuo for 24 hours at 60° C., the films were washed free of solvent with hot water and then dried. The films thus obtained were dyed as follows with the basic dye Astrazonblau B (Color Index, 2nd Edit., vol. III, No. 42140).

Composition of the dye bath:

100 m. of Astrazonblau B solution (1 g./l.)
2 ml. of acetic acid (30 g./l.)
0.3 ml. of sodium acetate (40 g./l.)

The dye was dissolved in boiling water, filtered and measured off while still hot. Approximately 0.5 to 1 g. of films was added at a dye bath temperature of 80° C., being dyed for 1 hour after the boiling temperature had been reached. The dyed films were thoroughly washed with water and dried.

In order quantitatively to determine the amount of dye absorbed, the dyed films were carefully dissolved in dimethyl formamide containing 1 g./litre of sulfuric acid. Determination was effected by measuring the extinction values at a wave length of 625 m$\mu$ (absorption maximum of the dye) with a spectrophotometer and a calibration curve (extinction—g./l. of dye). The measurements are set out in Table III (g. of dye×100/g. of film):

TABLE III

| Polymer from Example No. | mvals. of acid gr./ 100 g. PM | g. of dye / g. of film ×100 |
|---|---|---|
| 1 | 5.1 | 0.72 |
| 2 | 17.9 | 3.10 |
| 3 | 5.2 | 0.74 |
| 4 | 17.5 | 3.06 |
| 5 | 5.4 | 0.78 |
| 6 | 19.6 | 3.25 |
| Comparison | 2.4 | 0.27 |

The polymers prepared in accordance with Examples 1 to 6 were readily soluble in dimethyl formamide, giving 25 to 28% by weight gel-free spinning solutions, depending upon the K-value. The resulting solutions were eminently spinnable by a conventional dry-spinning process, while the stretched filaments, after-treated in the usual way, were naturally white and had a better thermal stability than those obtained from the comparison polymer. It was possible to dye them in deep and very deep shades with basic Astrazon dyes.

EXAMPLE 7

Solution polymerisation was carried out in a double-walled 150-litre-capacity V4A-agitation vessel equipped with a thermometer, vacuum connection and nitrogen inlet. The reaction mixture contained 65 kg. of dimethyl formamide, 32.8 kg. of acrylonitrile, 2.1 kg. of methyl acrylate, 800 g. of N-($\beta$-sulfoethyl)-N'-($\beta$-methacryloyloxyethyl)-urea (in the form of a 60% by weight aqueous solution, 87.5 g. of mono-tert-butyl permaleate (in the form of a 50% by weight paste in dimethyl phthalate), 122 g. of benzene sulfinic acid amide and 85 g. of concentrated sulfuric acid. After the reaction component had been introduced into the vessel in the order in which they are listed above, the vessel was sealed and briefly evacuated, after which the pressure was adjusted to 0.3 atms. with nitrogen and maintained at this level during polymerisation. The solution was stirred intensively for 15 hours at a reaction temperature of 33 to 37° C. Polymerisation was then stopped by the addition of an inhibitor. The pale yellow clear viscous solution had a polymer concentration of 29.8% by weight (corresponding to an 83.5% conversion). The K-value of the polymer was 82.8. The highly viscous solution was diluted until its concentration was 25.5% by weight by the addition of dimethyl formamide and passed through a falling film evaporator where any unreacted acrylonitrile and methyl acrylate monomers were removed at reduced pressure to a residual content of 0.4% by weight. Following distillation, the solution had a concentration of 29.6% by weight, was completely clear and gel-free and could be spun satisfactorily by a dry-spinning process. 100 g. of polymer were found by titration to contain 6.5 mvals. of sulfo groups. The spun filaments could be dyed in deep shades with basic Astrazon dyes.

EXAMPLE 8

The following mixture was polymerised in the same reaction vessel and under the same conditions as described in Example 7: 52 kg. of dimethyl formamide, 28.8 kg. of acrylonitrile, 19.2 kg. of vinylidene chloride, 1.2 kg. of the compound

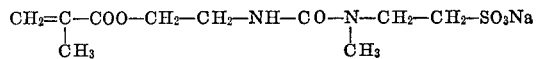

in the form of a 60% by weight aqueous solution, 105 g. of mono-tert.-butyl permaleate (=210 g. in the form of a 50% by weight paste in dimethyl phthalate), 147 g. of benzene sulfinic acid amide and 93 g. of concentrated sulfuric acid. Polymerisation was stopped after a reaction time of 17 hours. A pale yellow clear viscous solution with a polymer content of 37.4% (conversion 76%, K-value 81.5) was formed. After it had been diluted to 28% by weight concentration with dimethyl formamide, this solution was distilled as described above. Following falling-film distillation, the solution had a polymer concentration of 35% by weight, a viscosity of 3,200 poises (as measured at 20° C.) and was completely clear and gel-free. It could be spun satisfactorily by a dry-spinning process. In order to test its stability (to gelling), some of the distilled solution was introduced at room temperature into a sealed vessel and its viscosity was measured at intervals. There was no change in its viscosity over a test period of 3 weeks. The polymer had a chlorine content of 28.2% by weight and contained 7.3 mvals. of sulfo groups per 100 g. The spun filaments showed greatly reduced inflammability, and a high affinity for basic dyes.

What we claim is:

1. An acrylonitrile copolymer comprising at least 50% by weight of copolymerised acrylonitrile, 0.1 to 10% by weight of an ethylenically unsaturated sulfonic acid compound of the formula

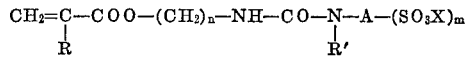

wherein R and R' each represents hydrogen atom or an alkyl radical, $n$ represents 2, 3 or 4, A represents an aliphatic hydrocarbon radical with at least two carbon atoms or an aromatic hydrocarbon radical, X represents hydrogen, ammonium, an alkali metal or organic ammonium cation, and $m$ represents 1 or 2, the balance being one or more additional copolymerisable monomers.

2. The acrylonitrile copolymer of claim 1, wherein said ethylenically unsaturated sulfonic acid compound is N-(β-sulfoethyl)-N'-(β-methacryloyloxyethyl)-urea or one of its alkali metal, ammonium or organic ammonium salts.

3. The acrylonitrile copolymer of claim 1, wherein said ethylenically unsaturated sulfonic acid compound is N-(p-sulfophenyl)-N'-(β-methacryloyloxyethyl)-urea.

4. The acrylonitrile copolymer of claim 1, wherein said ethylenically unsaturated sulfonic acid compound is N-(2, 4-disulfophenyl)-N-(β-methacryloyloxyethyl)-urea.

5. The acrylonitrile copolymer of claim 1, wherein said additional copolymerisable monomer is methyl acrylate.

6. The acrylonitrile copolymer of claim 1, wherein said additional copolymerisable monomer is vinylidene chloride.

7. A process for the production of acrylonitrile copolymers containing at least 50% of copolymerised acrylonitrile in the presence of a radical-forming catalyst in a liquid medium, which comprises copolymerising acrylonitrile with 0.1–10% by weight of an ethylenically unsaturated sulfonic acid compound of the formula

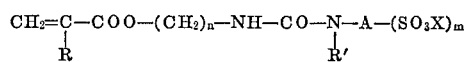

wherein R and R' each represents a hydrogen atom or an alkyl radical, $n$ represents 2, 3 or 4, A represents an aliplastic hydrocarbon radical with at least two carbon atoms or an aromatic hydrocarbon radical, X represents hydrogen, ammonium, an alkali metal or organic ammonium cation, and $m$ represents 1 or 2, the balance being one or more additional copolymerisable monomers.

8. The process of claim 7, wherein said copolymerising is carried out in aqueous medium at a pH-value from 6 to 2 in the presence of a redox catalyst system consisting of a persulfate and a bisulfite compound.

9. The process of claim 7, wherein said copolymerising is carried out in an organic polar solvent in the presence of a radical catalyst.

10. The process of claim 9, wherein said organic polar solvent is dimethylformamide.

References Cited

UNITED STATES PATENTS 2,983,712 5/1961 Wilkinson.
3,408,338 10/1968 Szita et al.

JAMES A. SEIDLECK, Primary Examiner

U.S. Cl. X.R.

8—55; 260—63, 78.5